United States Patent
Movafaghian et al.

(10) Patent No.: US 7,638,062 B2
(45) Date of Patent: Dec. 29, 2009

(54) ULTRA COMPACT CYCLONIC FLOTATION SYSTEM

(75) Inventors: Shaya Movafaghian, Houston, TX (US); James C. T. Chen, Houston, TX (US)

(73) Assignee: Cameron International Corporation, Houston, TX (US)

( * ) Notice: Subject to any disclaimer, the term of this patent is extended or adjusted under 35 U.S.C. 154(b) by 269 days.

(21) Appl. No.: 11/483,490

(22) Filed: Jul. 10, 2006

(65) Prior Publication Data

US 2008/0006588 A1     Jan. 10, 2008

(51) Int. Cl.
  C02F 1/38     (2006.01)
  B01D 17/038   (2006.01)
  B01D 21/26    (2006.01)
(52) U.S. Cl. ............ 210/703; 210/712; 210/788; 210/806; 210/188; 210/195.1; 210/221.2; 210/295; 210/512.1; 210/512.2
(58) Field of Classification Search ......... 210/703, 210/712, 788, 188, 195.1, 221.2, 512.1, 512.2, 210/295, 806; 96/261; 55/459.1
See application file for complete search history.

(56) References Cited

U.S. PATENT DOCUMENTS

| | | | |
|---|---|---|---|
| 4,094,783 A | 6/1978 | Jackson | |
| 4,255,262 A | 3/1981 | O'Cheskey et al. | |
| 4,876,016 A * | 10/1989 | Young et al. | 210/512.1 |
| 5,458,738 A * | 10/1995 | Chamblee et al. | 210/512.1 |
| 5,965,021 A * | 10/1999 | Hesse et al. | 210/512.2 |
| 6,073,775 A | 6/2000 | Liu | |
| 6,849,182 B2 * | 2/2005 | Redding | 210/512.1 |
| 7,157,007 B2 * | 1/2007 | Frankiewicz et al. | 95/261 |
| 2004/0011745 A1 | 1/2004 | Oserod | |

OTHER PUBLICATIONS

Petreco International Inc., "Krebs Wellhead Desanders," 2003, USA.

* cited by examiner

*Primary Examiner*—David A Reifsnyder
(74) *Attorney, Agent, or Firm*—Mossman Kumar & Tyler PC

(57) ABSTRACT

A cyclonic flotation system may be used to separate oil, grease, solids and other suspended matter from produced water by a combination of flotation and centrifugation in a separator cyclone. The cyclonic flotation system has a higher capacity-to-footprint ratio compared to conventional apparatus resulting in reduced weight and cost. The system is motion independent and suitable for use on floating structures such as offshore platforms and vessels.

20 Claims, 1 Drawing Sheet

ULTRA COMPACT CYCLONIC FLOTATION SYSTEM

BACKGROUND OF THE INVENTION

The present invention relates to methods and apparatus for separating contaminants from water, and more particularly relates, in one embodiment, to methods and apparatus for separating or dividing or removing oil, grease, solids and/or other suspended matter from produced water by a combination of flotation and centrifugation actions.

In many industries, including oil, paper and pulp, textile, electricity generating and food processing, there is an ever-present problem of contaminated water as a by-product of various processes. In particular, water is often associated with the production of oil and gas. Water subsequently produced from the formation ("produced water" originating from the operators or other sources) becomes contaminated with oil and solids encountered in the formation, and therefore cannot be disposed of simply by discharging into the surrounding water. Accordingly, numerous methods and systems have been devised to reduce the contaminant content of this produced water to a level allowed by local environmental laws and regulations. Treatment of produced water is particularly of interest in offshore oil and gas facilities, where majority of associated water is discharged overboard and into the open waters or reinjected into the reservoir or disposal wells. The ever tightening environmental regulations and associated cost with this additional treatment, is the driving force for new and improved methods of treatment.

U.S. Pat. No. 4,094,783 describes a multi-stage, recycling, centrifugal, flotation separator system that includes a circular cylindrical vessel with a vertical axis, having a horizontal tray positioned inside the vessel near the top, where the tray has an axial opening. Means are included for introducing air under pressure into the vessel at the top thereof, and other means are provided for introducing contaminated liquid into the vessel through a tangential pipe, under pressure, at a level below the tray. A mechanism is also provided to recycle air from the top of the vessel into the inlet line and to mix the recycled air with the contaminated liquid before entry into the vessel. There is additionally described means to recycle liquid from the bottom of said vessel, through a tangential pipe into the vessel at a level below that of the contaminated liquid, and means to mix recycled air with the recycled liquid prior to entry into the vessel. Although this system has a relatively small footprint for a flotation system because of its vertical orientation, it suffers from many of the same drawbacks with respect to the system disclosed in U.S. Pat. No. 4,255,262.

The overall construction and manner of operation of hydrocyclones are well known. A typical hydrocyclone includes an elongated body surrounding a tapered separation chamber of circular cross-section, the separation chamber decreasing in cross-sectional size from a large overflow and input end to a narrow underflow end. An overflow or reject outlet for the lighter fraction is provided at the wider end of the conical chamber while the heavier underflow or accept fraction of the suspension exits through an axially arranged underflow outlet at the opposite end of the conical chamber. (It will be appreciated that the terms "reject" and "accept" are relative and depend upon the nature and value of the lighter and the heavier fractions.) Liquids and suspended particles are introduced into the chamber via one or more tangentially directed inlets, which inlets create a fluid vortex in the separation chamber. The centrifugal forces created by this vortex throw denser fluids and particles in suspension outwardly toward the wall of the conical separation chamber, thus giving a concentration of denser fluids and particles adjacent thereto, while the less dense fluids are brought toward the center of the chamber and are carried along by an inwardly-located helical stream created by differential forces. The lighter fractions are thus carried outwardly through the overflow outlet. The heavier particles and/or fluids continue to spiral along the interior wall of the hydrocyclone and exit the hydrocyclone via the underflow outlet.

The fluid velocities within a hydrocyclone are high enough that the dynamic forces produced therein are sufficiently high to overcome the effect of any gravitational forces on the performance of the device. Hydrocyclones, especially those for petroleum fluid processing, are commonly arranged in large banks of several dozen or even several hundred hydrocyclones with suitable intake, overflow and underflow assemblies arranged for communication with the intake, overflow and underflow openings, respectively, of the hydrocyclones.

Hydrocyclones are used both for the separation of liquids from solids in a liquid/solid mixture ("liquid/solid hydrocyclones") as well as for the separation of liquids from other liquids ("liquid/liquid hydrocyclones"). Different constructions are used for each of these hydrocyclone devices. Generally, the liquid/liquid type of hydrocyclone is longer in the axial direction than a solid/liquid hydrocyclone and is thinner as well. As a result of these structural differences, it cannot be assumed that the design and structure of a liquid/liquid hydrocyclone usefully translates to a liquid/solid hydrocyclone and vice versa.

In the recovery of hydrocarbons from subterranean formations, it is common that the fluids produced are mixtures of aqueous fluids, typically water, and non-aqueous fluids, typically crude oil. These fluid mixtures are often in the form of suspensions and/or dispersions together with solids or suspended matter that are all difficult to separate from the water. Hydrocyclones are known to be a useful physical method of separating oil phase fluids from aqueous phase fluids, along with other apparatus including, but not necessarily limited to, settling tanks, centrifuges, membranes, and the like. Additionally, electrostatic separators employ electrical fields and the differences in surface conductivity of the materials to be separated to aid in these separations.

As mentioned, "produced water" is the term used to refer to streams generated by the recovery of hydrocarbons from subterranean formations that are primarily water, but may contain significant amounts of non-aqueous contaminants dispersed therein. Typically, produced water results from an initial separation of oil and water, and accounts for a majority of the waste derived from the production of crude oil. After a primary process of separation from the oil, the produced water still contains drops or particles of oil in emulsion in concentrations as high as 2000 mg/l, and often solids or other suspended matter and thus it must be further treated before it may be properly discharged to the environment. Every country has set limits for the concentration of oil dispersed in the water for off-shore wells and for near-shore fields. Even if the produced water is returned to the field, it is advisable to remove as much of the oil and suspended solids (e.g., sand, rock fragments, and the like) as possible in order to minimize the risk of clogging the field.

Thus, conventional flotation units are bulky, heavy, and as noted, motion dependent or motion affected. There is a market demand for alternative technologies to reduce the footprint, weight and cost. It would also be helpful if a new technology did not depend upon a gas-liquid interface. It would be desirable if methods and apparatus were devised that could simultaneously remove oil and other non-aqueous species from produced water and contaminated water with greater efficiency than at present.

BRIEF SUMMARY OF THE INVENTION

In carrying out these and other objects of the invention, there is provided, in one non-restrictive form, a compact cyclonic flotation apparatus that includes a separator cyclone that in turn has at least one tangential inlet, at least one overflow outlet and at least one underflow outlet. The apparatus further includes at least one feed conduit leading to a tangential inlet, where the feed conduit in turn includes at least one port connected to a gas source and optionally at least one inline disperser to distribute the gas evenly in the feed conduit.

As another example and in another non-limiting embodiment, a method for at least partially removing a contaminant from water mixed therewith is provided herein. The method includes transporting water containing at least one contaminant that may be oil, grease and/or suspended matter, into a separator cyclone. The method further involves introducing at least one gas into the water prior to the separator cyclone. The method also entails rejecting separated contaminants and the injected gas through the overflow of the cyclone separator. Method also adds means for further separation of the cyclone reject stream into oily water mixture and gas separated by cyclonic action. The gas may be recovered from the oily water reject stream to be reused.

Figure 1:
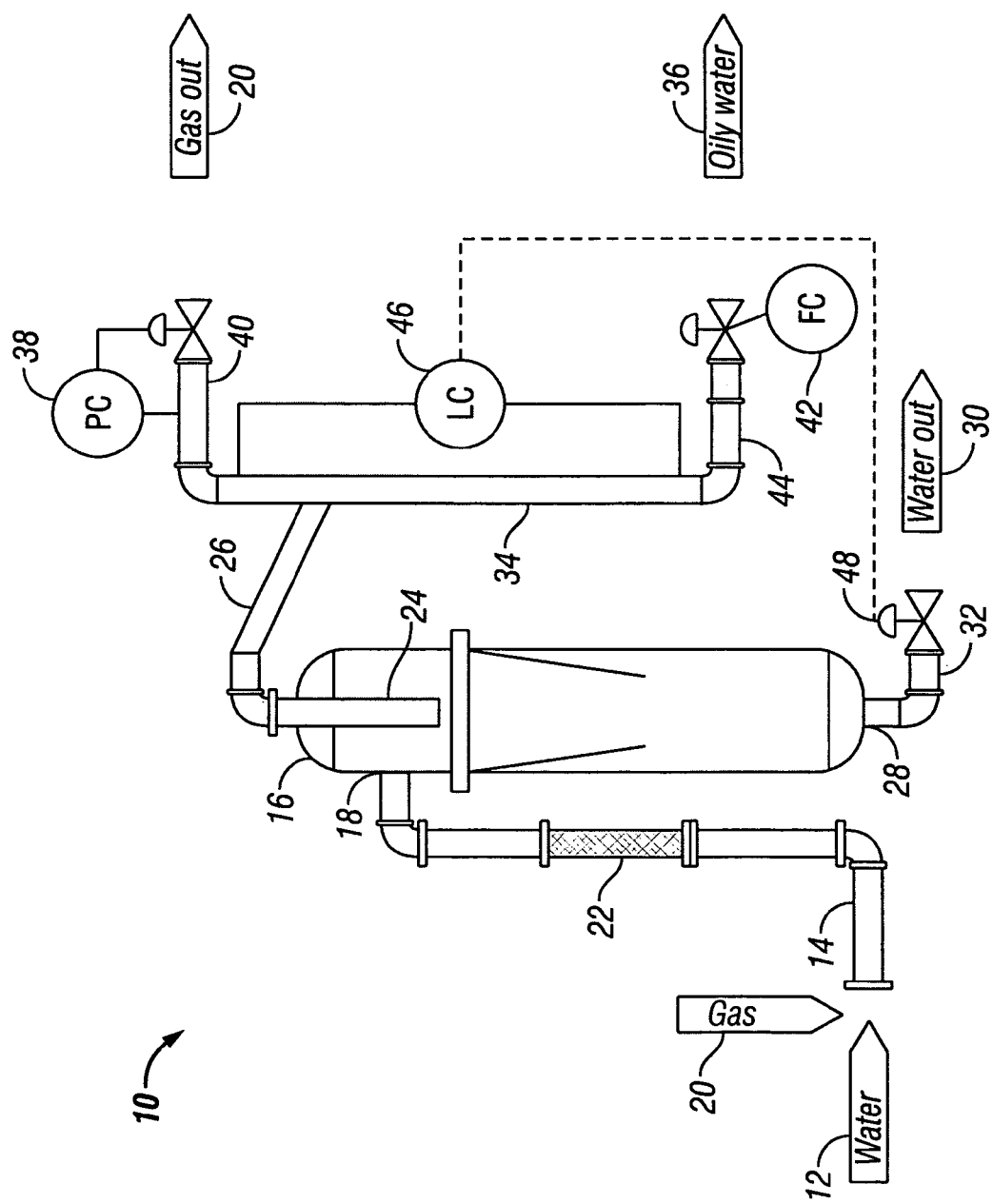
FIG. 1 is a schematic illustration of one non-limiting embodiment of the apparatus or system showing the introduction of gas into an aqueous fluid prior to its introduction to an optional disperser and separation in a cyclone, followed by an optional separator.

It will be appreciated that the Figures are schematic illustrations that are not to scale or proportion, and, as such, some of the important parts of the invention may be exaggerated for illustration.

DETAILED DESCRIPTION OF THE INVENTION

Non-limiting exemplary methods and apparatus described herein enhance the removal of oil, grease and/or suspended matter from water intermixed therewith by combination of flotation and centrifugation processes, particularly the cyclonic action of a cyclone, which may be a hydrocyclone. A gas, typically natural gas, is injected or introduced into the mixture of water with the oil, grease and/or suspended matter (e.g. solids) to be sheared, fragmented, or otherwise divided and evenly distributed, by passing through the disperser, into swarm or cloud of small gas bubbles to help float the oil, grease and/or suspended matter radially and upwardly to separate it from the water. Subsequently the cyclone separates the floated suspended matter, grease and/or oil from the water at a higher removal efficiency than a conventional flotation tank or vessel operating with no or equal centrifugal forces. A non-limiting application for the apparatus and methods herein is to separate the components of a wellbore fluid involved in hydrocarbon recovery, including, but not necessarily limited to, produced water from a subterranean formation. In a non-restrictive instance, produced water on an offshore platform that has the contaminants sufficiently removed therefrom may be properly disposed of in the sea.

In more detail, one non-restrictive example includes utilization of this method to enhance removal efficiency of cyclones in a produced water treatment, where existing hydrocyclones or degassers or flotation units do not meet oil and grease discharge requirements. The system herein separates the floated matter and the flotation gas into two separate streams by means of a gas-liquid cylindrical cyclone. The gas phase may be vented or recycled. The system may be designed with a higher capacity-to-footprint ratio compared to conventional or available technologies, resulting in needed and desired weight and cost reduction. In addition, the system will be motion independent. The system here may be usefully employed after an initial separation of hydrocarbon (e.g. oil) and water to further clean and clarify the previously separated produced water to much lower oil-in-water specifications.

Conventional flotation units are bulky, heavy and motion dependent, and rely on a gas-liquid interface for separation. The present method and system do not rely on the formation of such an interface within the vessel, and thus the operation of the cyclone is unaffected by the motion of the offshore platform or ship on which it is installed. Indeed, the separator cyclone herein does not have an interface per se.

As in conventional cyclones, the separator cyclone here generally has both an underflow outlet and an overflow outlet, where the clarified water leaves via the underflow outlet and the gas and contaminants leave via the overflow outlet. The ultra compact cyclonic flotation (UCCF) unit contemplated herein will be suitable for partial removal or polishing of hydrocarbon contaminants from produced water, primarily, but not necessarily limited to, offshore facilities.

The methods and units herein are expected, but not necessarily limited to, removing at least half of the gas and at least half of the contaminant via the overflow outlet from the water, at least half of which is removed from the cyclone via the underflow outlet. It will be appreciated that it is not necessary for the separator cyclone to remove all of the contaminants from the water for the methods and apparatus herein to be considered successful. However, it is a goal of the methods and apparatus herein to remove as much of the contaminants from the water as possible, and hence, as much of the gas as well. Thus, in another nonrestrictive version at least about 90 volume % of the contaminants and/or at least about 90 volume % of the gas is removed in the separator cyclone. In another embodiment, substantially all (at least about 95 volume %) of the contaminants and/or the gas are removed from the water. Similarly, it is a goal herein to remove as much of the water from the underflow outlet of the separator cyclone as possible, which may be at least about 90 volume %, and alternatively substantially all of the water (at least about 95 volume %). It is expected that in many systems the separator cyclone herein will be used in conjunction with other separator techniques and apparatus. In one non-limiting embodiment, the device can be used as a polishing stage downstream from a conventional separation stage such as a liquid-liquid hydrocyclone or conventional dissolved gas flotation, where contaminants (oil and grease) are removed from the produced water prior to release to the environment. In mature fields, it is common for such facilities to operate out of specification due to changes in water production rate and other process parameters over the life of the field. The only solution to meet the environmental dis-charge specification is to replace the inefficient separation units with ones of larger size or of more efficient technologies. UCCF, as an add-on polishing stage, will be able to provide much more economical alternative, due to its small foot-print and increased performance by eliminating large capital investment associated with the replacement of processing equipment in an existing facility.

The UCCF unit herein is expected to operate at forces between about 10 to about 30 Gs, alternatively from a lower threshold of about 15 Gs to an independent, alternative threshold of about 25 Gs. In comparison, prior separation flotation units operate within about 0 to about 5 Gs—a relatively lower range. This difference in the forces employed may result in an at least 30% reduction in diameter of the cyclone with similar capacity, thus resulting in significant weight and cost advantages for an improved removal efficiency.

An important feature of the UCCF unit and the method herein is the introduction of at least one gas into the water (mixed with the contaminant) before the water is introduced or injected into the hydrocyclone. The contaminated water may be flowing through a conduit, such as a pipeline or tube, and the gas injected into the water through a port or other suitable injector or opening. As noted, the gas may typically be natural gas, although other suitable gases include, but are not necessarily limited to, nitrogen, and the like. The proportion of gas to be used is difficult to specify in advance due to a number of interrelated factors including, but not limited to, the proportion and type(s) of contaminant in the water, the flow rate and centrifugal force applied in the cyclone, the desired separation proportion of the contaminant(s), among other factors. Nevertheless, in order to give some indication of appropriate gas proportions, the amount of gas introduced into the water may range from about 0.05% vol./vol. to about 0.5 vol./vol.; alternatively, from a lower threshold of about 0.1% vol./vol. independently to an upper threshold of about 0.3% vol./vol. The gas medium introduced from an external source enhances the separation of liquid oil or grease droplets and suspended solid matter. Suitable gas sources include, but are not necessarily limited to, pressure tanks and compressors, or recycled from the cyclone reject stream. As noted, the oil droplets and other contaminants in the influent to the separator cyclone will be swept radially and vertically by dispersed gas bubbles in a moderate centrifugal field (10s of Gs). The pressure of the gas may be in one non-limiting embodiment slightly over the feed pressure of the water mixture.

The pressure drop across the system may be specified as desired by the designer. In a non-restrictive embodiment of the UCCF, and in some general applications, in a typical produced water treatment train, particularly at or near the end of the train, the pressure drop is more desirably be low. In one non-limiting embodiment, the pressure drop across the system may be about 15 psid (about 0.1 MPa). The optional in-line disperser at the inlet of the separator cyclone may thus be designed for a pressure drop of about 3 to 4 psid (about 21 to about 28 kPa). This value and all other pressure losses in the system are included in the overall estimated 15 psid (0.1 MPa).

As noted, there may be optionally present between or intermediate the port introducing the gas into the water and the separator cyclone a disperser to help assure uniform distribution or dispersion of the gas medium. The disperser may be any conventional device for increasing the uniform distribution of gas bubbles in the water.

In another optional embodiment of the UCCF herein, there is provided an additional or secondary separator downstream from the overflow outlet for substantially separating the gas from the oil, grease and other contaminants. It is expected that in most embodiments some water will be separated out with the gas and contaminants, and that in the secondary separator the oil, grease, solids and other suspended matter will flow out with the water and substantially all (about 95 volume % or more) of the gas will separate overhead from the oily or contaminated water. Optionally, the recovered gas may be recycled back to the injection port, and/or may alternatively be discharged into the appropriate vent lines.

Shown in more detail with respect to FIG. 1 is a non-limiting exemplary UCCF system or apparatus 10 for removing contaminants (e.g. oil, grease, solids and other suspended matter) from water such as produced water 12. The water 12 containing at least one contaminant is transported through a conduit 14 to separator cyclone 16 and introduced thereto at an inlet 18. Gas 20 is introduced or injected into the water through a port (not shown) upstream of the separator cyclone 16. There may be optionally present intermediate the port and the cyclone 16 a disperser 22 to disperse the gas uniformly within the water.

The separator cyclone 16 receives the water 12 via the conduit 14 at the inlet 18 at relatively high speed and at an angle or tangent as in a cyclone to induce cyclonic action in the range of tens of G forces. Cyclone 16 has at least one overflow outlet 24 for removing at least half of the gas and at least half of the contaminants, such as via conduit 26; as well as an underflow outlet 28 for removing at least half of the clarified water 30, such as via conduit 32.

The combination of oily water containing other contaminants and the gas 20 may optionally be sent via conduit 26 to a secondary separator 34, which separates out the gas 20 from the oily water 36 containing the oil, grease and solids. In one non-restrictive embodiment the secondary separator 34 may be equipped with a pressure controller 38 on the gas outlet 40 and a flow controller 42 on the oily water outlet 44. These devices help regulate flow through the system 10. Further, a level controller 46 in the secondary separator 34 may control flow of the water through conduit 32 at valve 48, further regulating flow through the UCCF system 10.

The UCCF units described herein are expected to be smaller and lighter than conventional flotation units, with attendant lower costs. Operating costs are also expected to be lower since throughputs/flow rates are expected to be faster and greater with these UCCF units. This is due in large part to the higher G forces employed by the UCCF units and methods. To generate the ranges of G forces contemplated herein, the separator cyclone must have higher throughputs or capacities for the same diameter vessel. Higher centrifugal force promotes better separation efficiency compared to conventional technologies. Elimination of the gas-liquid interface as a control variable makes the UCCF system virtually motion insensitive, which is very important to floating platforms and ships.

In the foregoing specification, the invention has been described with reference to specific embodiments thereof, and is expected to be effective in providing methods and apparatus for separating oil, grease, solids and other suspended matter more efficiently from water with which the contaminants are mixed. However, it will be evident that various modifications and changes can be made thereto without departing from the broader spirit or scope of the invention as set forth in the appended claims. Accordingly, the specification is to be regarded in an illustrative rather than a restrictive sense. For example, the separator cyclones, dispersers, secondary separators and control devices may be changed or optimized from those illustrated and described, and even though they were not specifically identified or tried in a particular system or apparatus, and would be anticipated to be within the scope of this invention. For instance, the use of gas injections and cyclones in series would be expected to find utility and be encompassed by the appended claims, for instance to more completely remove the contaminants in stages. Different produced water and other industrial product water, and contaminants other than those described herein may nevertheless be treated and handled in other non-restrictive embodiments of the invention.

We claim:

1. A compact cyclonic flotation apparatus comprising:
   a separator cyclone having:
      at least one tangential inlet;
      at least one overflow outlet;
      at least one underflow outlet; and
      an absence of a gas-liquid interface; and
   at least one liquid conduit leading to the at least one tangential inlet, the at least one liquid conduit comprising at least one port connected to a gas source.

2. The apparatus of claim 1 further comprising at least one disperser intermediate the at least one port and the separator cyclone.

3. The apparatus of claim 1 further comprising an additional separator downstream from the at least one overflow outlet.

4. The apparatus of claim 1 where the separator cyclone is capable of being operated between about 10 and about 30 Gs.

5. A compact cyclonic flotation apparatus comprising:
   a separator hydrocyclone having:
      at least one tangential inlet,
      at least one overflow outlet;
      at least one underflow outlet;
      an absence of a gas-liquid interface;
   at least one liquid conduit leading to the at least one tangential inlet, the at least one liquid conduit comprising at least one port connected to a gas source;
   at least one disperser intermediate the at least one port and the separator hydrocyclone; and
   at least one additional separator downstream from the overflow outlet adapted to separate out gas.

6. The apparatus of claim 5 where the separator hydrocyclone is capable of being operated between about 10 and about 30 Gs.

7. The apparatus of claim 5 further comprising at least one gas recycle line from the additional separator, where the separated out gas is the gas source to the at least one port.

8. A method for at least partially removing a contaminant from water mixed therewith, comprising:
   transporting water containing at least one contaminant selected from the group consisting of oil, grease and suspended matter, into a separator cyclone;
   introducing at least one gas into the water prior to the separator cyclone; and
   separating by cyclonic action at least some of the gas and at least some of the contaminant from at least some of the water in an absence of a gas-liquid interface.

9. The method of claim 8 where the at least some of the gas and the at least some of the contaminant is removed from the separator cyclone through at least one overflow outlet in fluid communication with the separator cyclone.

10. The method of claim 8 where the at least some of the water is removed from the separator cyclone through at least one underflow outlet in fluid communication with the separator cyclone.

11. The method of claim 8 further comprising dispersing the gas uniformly into the water intermediate its introduction into the water and the separator cyclone.

12. The method of claim 8 further comprising sending at least some of the gas and at least some of the contaminant to an additional separator and substantially separating at least some of the gas from the contaminant.

13. The method of claim 12 further comprising recycling at least a portion of the substantially separated at least some of the gas to the separator cyclone.

14. The method of claim 8 where at least some of the water is separated with the at least some of the gas and the at least some of the contaminant, when they are separated from the at least some of the water.

15. The method of claim 8 where the cyclonic action is between about 10 and about 30 Gs.

16. A method for at least partially removing a contaminant from water mixed therewith, comprising:
   transporting water containing at least one contaminant selected from the group consisting of oil, grease and suspended matter, into a separator hydrocyclone;
   introducing at least one gas into the water prior to the separator hydrocyclone;
   dispersing the gas uniformly into the water; and
   separating by cyclonic action of between about 10 and about 30 Gs at least some of the gas and at least some of the contaminant from at least some of the water in the separator hydrocyclone in an absence of a gas-liquid interface.

17. The method of claim 16 where the at least some of the gas and at least some of the contaminant is removed from the separator hydrocyclone through at least one overflow outlet in fluid communication with the separator hydrocyclone.

18. The method of claim 16 where the at least some of the water is removed from the separator hydrocyclone through at least one underflow outlet in fluid communication with the separator hydrocyclone.

19. The method of claim 16 further comprising sending at least some of the gas and at least some of the contaminant to an additional separator and substantially separating at least some of the gas from the contaminant.

20. The method of claim 16 where at least some of the water is separated with the at least some of the gas and the at least some of the contaminant, when they are separated from at least some of the water.

* * * * *